United States Patent
Grabau et al.

(10) Patent No.: US 10,718,727 B2
(45) Date of Patent: Jul. 21, 2020

(54) VALVE PROGNOSTICS FOR POLYMERIC COMPONENTS BASED ON ACCELERATED AGING TECHNIQUES

(71) Applicant: FISHER CONTROLS INTERNATIONAL LLC, Marshalltown, IA (US)

(72) Inventors: Ted Dennis Grabau, Marshalltown, IA (US); Meredith Bell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 662 days.

(21) Appl. No.: 14/211,129

(22) Filed: Mar. 14, 2014

(65) Prior Publication Data

US 2015/0088434 A1  Mar. 26, 2015

Related U.S. Application Data

(60) Provisional application No. 61/785,014, filed on Mar. 14, 2013.

(51) Int. Cl.
  *F16K 37/00* (2006.01)
  *G01N 25/00* (2006.01)
  *G01M 99/00* (2011.01)

(52) U.S. Cl.
  CPC .......... *G01N 25/00* (2013.01); *F16K 37/0075* (2013.01); *G01M 99/008* (2013.01); *Y02P 90/265* (2015.11)

(58) Field of Classification Search
  CPC ....... G05B 2219/37253; F16K 3/00757; F16K 31/0075
  See application file for complete search history.

(56) References Cited

U.S. PATENT DOCUMENTS 5,311,562 A  *  5/1994  Palusamy ............. G21C 17/00
                                                                376/215
5,646,600 A    7/1997  Abdel-Malek et al.
(Continued)

FOREIGN PATENT DOCUMENTS

CN    101443735 A    5/2009
CN    202710679 U    1/2013
(Continued)

OTHER PUBLICATIONS

International Search Report issued in PCT/US2014/026970 dated Aug. 20, 2014.
(Continued)

*Primary Examiner* — Jennifer E Simmons
(74) *Attorney, Agent, or Firm* — Marshall, Gerstein & Borun LLP

(57) ABSTRACT

The claimed method and system develops accelerated aging test protocols for a component of a process control device, such as a polymeric component of a valve assembly, where the accelerated aging test protocol is specifically developed in response to expected operating conditions to be used during operation of the process control device in a process plant installation. Test data from the developed accelerated aging tests is analyzed to determine a projected lifetime profile of the component that profiles the component through failure under those expected operating conditions. Particular profiling for polymeric features includes oxidation failure profiling and other fatigue conditions.

15 Claims, 8 Drawing Sheets

(56) References Cited

U.S. PATENT DOCUMENTS

| | | | |
|---|---|---|---|
| 6,411,908 B1 | 6/2002 | Talbott | |
| 6,873,932 B1* | 3/2005 | Kim | G01R 31/287 |
| | | | 702/182 |
| 7,831,396 B2 | 11/2010 | Voigtlaender et al. | |
| 2002/0013643 A1* | 1/2002 | Ishii | G05B 23/0283 |
| | | | 700/289 |
| 2008/0288321 A1 | 11/2008 | Dillon et al. | |
| 2009/0204234 A1* | 8/2009 | Sustaeta | G05B 13/024 |
| | | | 700/29 |
| 2010/0179697 A1* | 7/2010 | Stelter | F16K 31/126 |
| | | | 700/282 |
| 2011/0094758 A1* | 4/2011 | Burkhart | A62C 35/62 |
| | | | 169/17 |
| 2011/0202800 A1 | 8/2011 | Mackey et al. | |
| 2012/0283963 A1* | 11/2012 | Mitchell | F01D 17/02 |
| | | | 702/34 |

FOREIGN PATENT DOCUMENTS

| | | |
|---|---|---|
| CN | 204164465 U | 2/2015 |
| DE | 102004060528 A1 | 6/2006 |
| JP | H03-277938 A | 12/1991 |
| JP | 2002-221076 A | 8/2002 |
| JP | 2002-374362 A | 12/2002 |
| JP | 2005-069938 A | 3/2005 |
| JP | 2006-85573 A | 3/2006 |
| JP | 2011-19347 A | 1/2011 |
| JP | 2011-123431 A | 6/2011 |

OTHER PUBLICATIONS

Written Opinion issued in PCT/US2014/026970 dated Aug. 20, 2014.
International Preliminary Report on Patentability issued in Application No. PCT/US2014/026970 dated Sep. 15, 2015.
Office Action issued in Japanese Patent Application No. 2016-502296 dated Oct. 31, 2017.
Office Action issued in Chinese Patent Application No. 201410098992.6 dated Sep. 12, 2017.
Office Action issued in Chinese Patent Application Publication No. 2016-502296 dated Jun. 28, 2018.
Appleton, S. "A Uniform Drive and Process Control System for the Pulp and Paper Industry," Pulp and Paper Industry Technical Conference, Conference Record of 1993 Annual Hyannis, pp. 181-183, Jun. 21, 1993.
Office Action issued in Russian Patent Application No. 2015140961 dated Feb. 16, 2018.
Examination Report issued in GCC Patent Application No. 2014/26831 dated Nov. 27, 2017.
Examination Report issued in GCC Patent Application No. 2014-26831 dated Oct. 30, 2018.
Examination Report issued in GCC Patent Application No. 2014-36971 dated Aug. 27, 2019.
Communication pursuant to Article 94(3) EPC cited in European Patent Application No. 14720817.7 dated Dec. 5, 2019.
Office Action issued in Japanese Patent Application No. 2016-502291 dated Jan. 28, 2020.
Office Action for Brazilian Application No. 11 2015 022775 9, dated Feb. 11, 2020.

* cited by examiner

VALVE PROGNOSTICS FOR POLYMERIC COMPONENTS BASED ON ACCELERATED AGING TECHNIQUES

RELATED APPLICATIONS

This application claims the benefit of priority of U.S. Provisional Patent Application 61/785,014, filed Mar. 14, 2013, entitled "Valve Prognostics for Polymeric Components Based on Accelerated Aging Techniques," which application is hereby incorporated herein by reference in its entirety and for all purposes.

FIELD OF TECHNOLOGY

The present disclosure relates to process control devices within process plants and, more specifically, to techniques for performing lifetime prognostics on the process control devices.

BACKGROUND

Existing process control systems may perform periodic diagnostics on process control devices, such as valves, to determine the operability and performance of such devices. Determining the operability of a process control device may permit better scheduling of maintenance of the process control device, thereby decreasing failure occurrences and down time. This may result in increased efficiency, safety, and revenue. The process control systems may use various sensors and other measurement devices to observe characteristics of a process control device. For example, some existing control systems may use a digital valve controller to measure and collect data from various sensors on a control valve.

Among the uses of data collected from control valves, customers desire the data to plan preventative maintenance for their process plants, hoping to avoid unplanned maintenance and loss of production cause by unexpected failures. Customers, for example, will want to know the projected life span of a valve, before requiring maintenance, as well as what repair procedures and replacement options are available and recommended. For the manufacturer, providing a precise life span prediction is challenging because actual process conditions will vary dramatically from customer to customer, or facility to facility, even within a processing plant. Specification sheets may be provided to the customers providing some projection data, and sometimes in response to customer provided design conditions. However, factors such as temperature and pressure often vary dramatically from those provided in the design conditions from the customer and either way, other varying conditions such as fluid state (liquid or vapor) and impurities (solid, liquid, or vapor) are typically not provided in the design conditions, or, as with the other factors, can vary considerably during actual use.

Conventionally, service and repair history data from customers would be collected to create Mean Time To Failure (MTTF) and Mean Time Between Failure (MTBF). This MTTF and MTBF data could then be used for predicting life span of a valve. Using this historical data can be limiting, however, because maintenance records may be incomplete or non-existent. Furthermore, customers may not desire to share such information out of a concern that their operating conditions would be disclosed to their competitors. The result is that MTTF and MTBF data, based on historical data, are often incomplete and not sufficiently informative.

Another technique for predicting MTTF and MTBF is through the use of laboratory data produced in conditions as closely approximating real life conditions as possible. Pressure and temperature conditions are usually easy to achieve in a well-equipped lab. Fluid properties and contaminations, however, are much more difficult to simulate; although the essential fluid properties typically can be achieved, i.e., oxidizing, non-oxidizing, wet, dry, lubricating and non-lubricating. Occasionally, even a known contamination can be achieved such as with particulates in the fluid stream. Laboratory cycle testing in particular, e.g., at the same temperature, pressure and fluid properties that represent particular valve service applications, can be an effective ersatz for actual field data. This is especially the case for valve components that are subject to normal mechanical wear or fatigue.

While laboratory testing is used, for the foregoing and other reasons, conventional testing methods of determining MTTF and MTBF are lacking. The methods are unable to account for the varied conditions and various factors that affect device life span, particularly, those relating to sliding stem valves and rotary valves, where the various components that can wear or fatigue, resulting in valve failure, are many and each with potentially different responses to operating conditions, such as temperature, pressure, fluid, etc.

SUMMARY OF THE INVENTION

In accordance with an example, a method for developing a projected lifetime profile for a component of a process control device is provided. The method may include receiving an identification of a component capable of experiencing mechanical wear or fatigue, over time, during operation of the process control device, and receiving an operating parameter corresponding to the component. That component performance degrades over time as a result of the changing values of that operating parameter. The method may include receiving previously-recorded performance data of a reference component collected during operation of the reference component under conditions compatible with conditions under which the process control device is to operate. The method may further include developing the projected lifetime profile for the component based on the previously-recorded performance data, wherein the projected lifetime profile indicates a projected lifetime of the component as a function of values of the operating parameter.

In accordance with another example, a method for determining a projected remaining lifetime for a component of a process control device is provided. The method may include receiving a projected lifetime profile for the component, where the projected lifetime profile is developed based on previously-recorded performance data collected during operation of a reference component under conditions compatible with conditions under which the process control device is to operate, and wherein the projected lifetime profile indicates a projected lifetime of the component as a function of an operating parameter. The method may include receiving current data on the operating parameter for the component during operation of the process control device. The method further includes analyzing that current data and the projected lifetime profile to determine a projected remaining lifetime for the component. The method may further include determining an operator notification state of the component based the determined projected remaining lifetime. In some examples, notification state data is communicated to remote personnel, such as a process control device operator or maintenance personnel, to schedule maintenance on the component.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
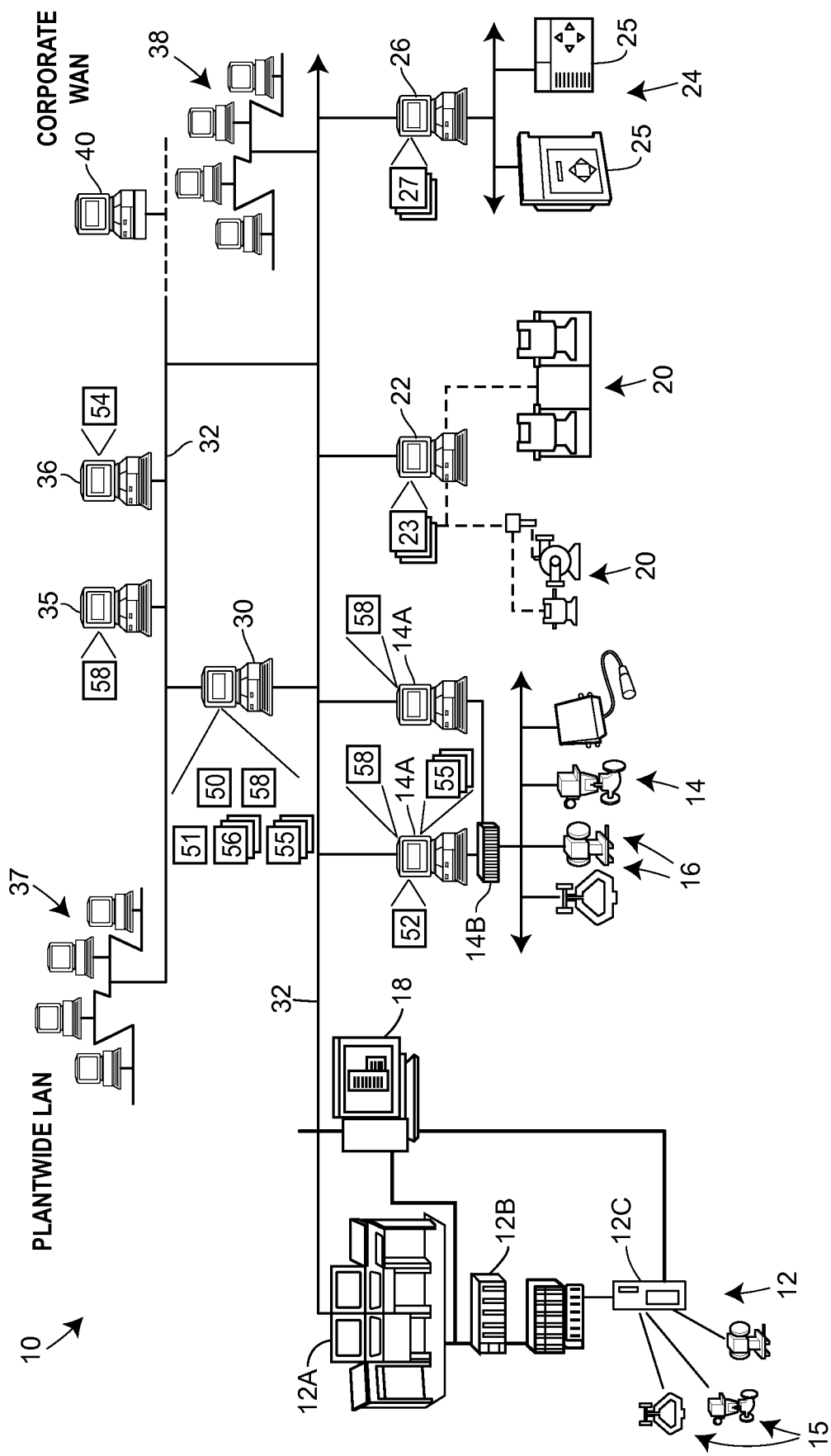
FIG. 1 is a diagram of a process plant configured to receive and coordinate data transfer between many functional areas of the plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 and 14 may be, for example, DeltaV™ controllers sold by Fisher-Rosemount Systems, Inc. of Austin, Tex. or any other desired type of controllers or DCS which My include an operator interface 12A coupled to a controller 12B and to input/output (I/O) cards 12C which, in turn, are coupled to various field devices such as analog and Highway Addressable Remote Transmitter (HART) field devices 15. The process control system 14 may include one or more operator interfaces 14A coupled to one or more distributed controllers 14B via a bus, such as an Ethernet bus. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing an asset management application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, asset management applications may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI 2140 Machinery Health Analyzer from CSI-Computational Systems, Inc. of Knoxville, Tenn. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

To facilitate communications regarding maintenance of the various equipment (i.e., process control devices), in the illustrated example, a computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the process control system 12 and to the maintenance interface 18 associated with that control system, is connected to the process control and/or maintenance interfaces 14A of the process control system 14, and is connected to the rotating equipment maintenance computer 22, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

Generally speaking, the computer 30 stores and executes an asset management system 50 that collects data and other information generated by the process control systems 12 and 14, the maintenance systems 18, 22 and 26 and the business systems 35 and 36 as well as information generated by data analysis tools executed in each of these systems.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset management system 50 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as an asset management application or any other maintenance programs, or as generated by the models in conjunction with the asset management system 50. Of course, the user interface routine 58 may provide any user access to and enable the user to change preferences or other variables used in any or all functional areas of the plant 10.

The plant 10 illustrates various process control devices (e.g., devices 14, 15, 16, 20, and 25), that may degrade in performance over time and require maintenance. Certain process control devices, such as a control valves, are used to modulate or control fluid flow within the process control system, under the control of process control systems 12 and 14. (Fluids, in this case, may include gaseous fluids such as compressed nitrogen gas, etc.) These are provided by way of example, as it should be understood by one of ordinary skill in the art that although the example embodiments described herein are based upon pneumatic control valves, other process control devices such as pumps, electrically-actuated valves, and dampers will also affect process plant operation and may be included in the techniques described herein.

In general, process control devices, such as control valve assemblies, may be positioned in conduits or pipes to control fluid flow by altering the position of a moveable element, such as a valve plug within the control valve, using an attached actuator and positioner. The adjustments to the control element may be used to influence some process condition to maintain a selected flow rate, a pressure, a fluid level or a temperature.

A control valve assembly is typically operated from a regulated source of pneumatic fluid pressure, such as air from a plant compressor. This fluid pressure is introduced into the actuator (such as a spring and diaphragm actuator for sliding stem valves or a piston actuator for rotary valves) through a positioner or valve control instrument which controls the fluid pressure in response to a signal received from the process control system. The magnitude of the fluid pressure in the actuator determines the movement and position of the spring and diaphragm or piston within the actuator, thereby controlling the position of a valve stem coupled to the moveable element of the control valve. For example, in the spring and diaphragm actuator, the diaphragm must work against a bias spring, to position the moveable element (i.e., valve plug) within a valve passageway between the inlet and the outlet of the control valve to modify flow within the process control system. The actuator may be designed so that increasing fluid pressure in the pressure chamber either increases the extent of the moveable element opening or decreases it (e.g., direct acting or reverse acting), the former situation being assumed herein. While these descriptions may be applicable to a sliding stem valve, corresponding components and operations would apply to rotary valves.

Figure 2:
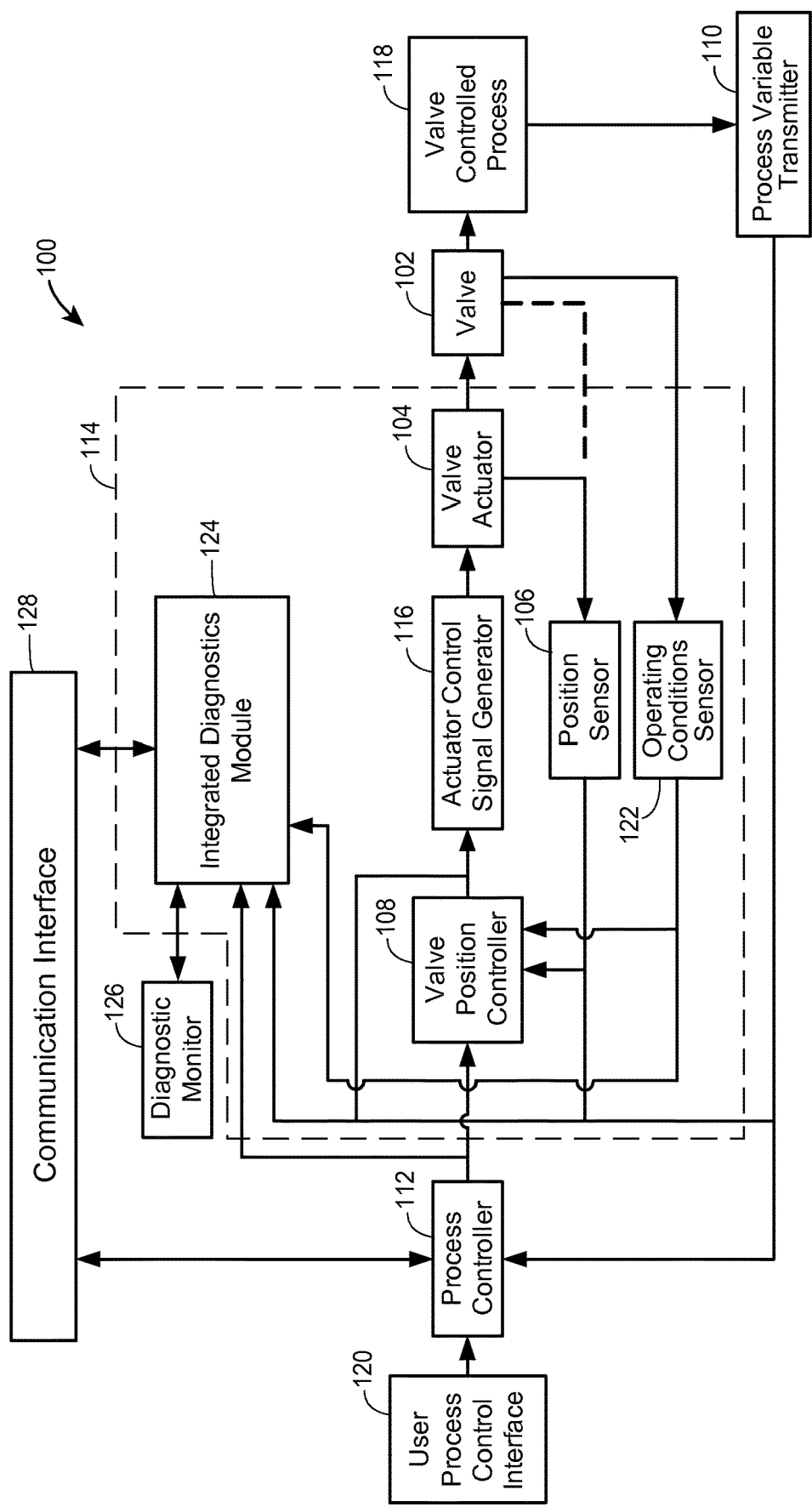
FIG. 2 is a block diagram of an example process control device used in a process control system, where the example process control device is a valve assembly having an embedded integrated diagnostics module.

FIG. 2 illustrates a general control valve assembly 100 that may be used in the process control system 12 or 14. A control valve 102 may have a moveable element, such as valve stem and valve plug (not shown), that is selectively positioned by an actuator 104 being controlled by a positioner to modify process flow. It is understood by one of ordinary skill in the art that an indication of the position of the valve plug moveable element is provided through a position sensor 106, which may be integrated into the valve position controller 108 or may be a standalone positioner transmitter. The control valve 102 creates a variable orifice within the flow path of the process control system to control the flow of process materials in the process control system. The process control system may generally use transmitter 110 to detect a process variable to characterize the process. The process variable may be transmitted back to a process device controller 112 directing the operation of the process plant to control the process.

A valve controller 114 includes the valve position controller 108, the position sensor 106 and may also include an actuator control signal generator 116, that may include, for example, an electro-pneumatic stage (not shown) that is controlled by a microcomputer provided therein, that generates an output signal from the valve position controller 108 to drive the actuator 104. It should be appreciated by one of ordinary skill in the art that the actuator may be an electric actuator (not shown) and the actuator control signal generator may provide an electric control signal to control or modify the position of the electric actuator. The actuator control signal generator 116 converts the output signal from valve position controller 108 to the corresponding control value to be established in the actuator 104. The position sensor 106 may monitor actuator 104 for position input information (via the actuator stem position) or control valve 102 (via the valve stem), shown as a dotted line.

In operation, a user interacts with the control valve 102 and process 118 at a user process control interface 120 that provides commands to the process controller 112 responsible for the control of the entire process, where the process controller 112 is in communication with other control devices (not shown) used in the plant for process control. The process controller 112 may translate the input commands supplied by the user at interface 120 into setpoint signal commands. The setpoint signal commands may then be sent to valve controller 114, and specifically to the valve position controller 108. The valve position controller 108 may have therein the microcomputer described above. The microcomputer may be programmed to follow an algorithm for controlling the control valve 102 in response to received setpoint signal commands and directing the actuator control signal generator 116 to generate a corresponding control signal in the actuator 104 for positioning the control valve 102.

In the system of FIG. 2, increases in magnitudes of the setpoint commands may cause corresponding increases in the pneumatic pressure provided by the actuator control signal generator 116 in the valve controller 114, thereby effecting, via the actuator 104, corresponding increases in the opening controlled by the moveable element of the control valve 102. The resulting position of the moveable element may have an effect on the process and, accordingly, on the process variable monitored and detected by the process variable transmitter 110. The process variable transmitter 110 transmits a representative signal of the process variable back to process controller 112. One of ordinary skill in the art will understand that the process controller 112 uses the representative signal as an indication of the status of the process for feedback to control the system.

As discussed above, the process controller 112 may be in communication with other control devices used in the plant for process control. The process controller 112 may also include or may be connected to a computer having general computing elements such as a processor or processing apparatus, a memory, an input device and a display device (e.g., monitor). The processor may be connected to the memory, the display device, and the input device, as known by those skilled in the art. Also, the computer may include a network interface for connecting between a network and the computer to provide communication therebetween. In one embodiment, the computer may form a portion of the process controller, such as in a digital process controller. In another embodiment, the user process control interface may represent the computer. Alternatively, the computer may be connected on a network to the process controller but be physically remote from the process controller.

The valve controller 114 also includes or, alternatively, receives information from, an operating conditions sensor 122 that monitors one or more operating conditions for the valve 102 and/or the valve actuator 104 and/or one or more environmental conditions under which the valve 102 is operating. The operating conditions sensor 122 may be any sensor or transmitter that detects or otherwise monitors an operating condition at or near the valve 102 or the valve actuator 104. For example, the operating conditions sensor may monitor a temperature of a fluid flowing through the valve 102, a temperature of fluid operating the valve actuator 104, a temperature of fluid moving through the position controller 108, an ambient air temperature of the valve 102, the valve actuator 104, or the valve position controller 108, a pH level of any of the fluids mentioned above, a pressure (upstream or downstream) of any of the fluids above, a salinity or viscosity of any of the fluids above, etc. The operating condition sensor 122 is coupled to provide sensed operating condition data to the valve position controller 108 for affecting control of the valve 102 and to an integrated diagnostics module 124. In some embodiments, operating condition sensor 122 transmits data to a data historian or other centralized data collection element, and the diagnostics module 124 retrieves the operating condition data therefrom.

Multiple operating conditions sensors 122 and/or multiple position sensors 106 may be disposed throughout the system shown in FIG. 2 to detect and/or measure characteristics of the control device and system and may provide this characteristic information or data to the computer or process device controller 112 for display on the display device element. In one embodiment, the sensor data from both sensors 106 and 122 are collected by the integrated diagnostics module 124, which may include a computer processor and memory. In some examples, a diagnostic monitor 126 coupled to the module 124 represents a computer display device that displays the sensor data or data output by the module 124. The input device element of the computer may be, for example, a keyboard, a touchpad, mouse, trackball, a lightpen, microphone (e.g., for voice command inputs), etc. Note also that various embodiments of the claimed method and system described below may be implemented as a set of instructions in the processor of the computer for execution, as known by those skilled in the art.

The integrated diagnostics module 124 develops and implements prognostic algorithms for process control devices to predict the end of usable life for these devices and/or various components thereof. Example process control devices exemplified herein are valve assemblies. However, more broadly, an integrated diagnostics module may be used with any process control device that experiences mechanical wear or fatigue over time, including devices that modulate fluid flow in a process, such as valves, pumps, and dampers, and may be implemented to predict the end of useable life for the components of each and any of these devices.

The integrated diagnostics module 124 assembles prognostics algorithms for components that form the process control device and from which usable remaining lifetime (e.g., remaining cycle life time, projected maintenance date) data may be determined. As discussed further below, the integrated diagnostics module 124 may derive these algorithms from documented average or minimum service life of multiple process control devices of the same type and construction materials, as used in a given application, from laboratory data collected in a manner that most nearly approximates field service conditions (e.g., operating environment), and/or from historical data of identical or similar devices, or parts of devices, in the plant or environment in which the device or part is installed. Such algorithms, therefore, may take into account those components that normally fail by mechanical wear or fatigue and which can be characterized as having a fixed or average lifetime when new. For example, when projecting cycle life, the integrated diagnostics module 124 may decrement a fixed or average cycle life, by each cycle experienced during operation. Such a decrement would occur automatically, for example, in response to an automatic sensor at the process control device or from operator input. As another example, the integrated diagnostics module 124 may decrement a fixed or average movement life (e.g., of a seal around a valve stem) by the cumulative movement of a part (e.g., the valve stem) as sensed by the position sensor 104 in the valve actuator 104 or in the valve 102, as controlled by the actuator control signal generator 116, as controlled by the valve position controller 108, or even as controlled by the process controller 112.

In some examples, the remaining lifetime is determined based at least in part on data from sensors (e.g., sensors 106 and 122) measuring normal operating conditions, where the data are collected at periodic determined time intervals, or on a continuous basis, or in response to some triggering event. In some examples, the remaining lifetime is determined based at least in part on information from the process controller 112, the valve position controller 108, and/or the valve actuator 104. For instance, the remaining lifetime may be determining, in some embodiments, according to the one or more operating conditions as sensed by the sensor 122 and according to the number of open/close cycles as instructed by the process controller 112 (as opposed to receiving the number of open/close cycles from the actuator 104 or the position sensor 106).

The integrated diagnostics module 124 is able to determine remaining lifetime for each replaceable component of the process control device (e.g., plugs, seals, bushings, bearings, etc.), as well as for the process control device as a whole. In either case, the remaining lifetime may be based solely on characteristics of the particular process control device or components in question or based on characteristics measured from other processing plant devices or data. The latter may include other devices operating in coordination with the device in question, as well general operating conditions of the processing plant. The particular remaining lifetime data may be stored in a computer readable memory device, for example, by a smart positioner device in a valve configuration, such as within the valve controller 114 of FIG. 2.

The integrated diagnostics module 124 is able to communicate with a remote computer, such as a system controller 12 or 14, through a communication interface 128 that may be a wired or wireless communication interface, which remote computer may, in some instances, take some process control action (e.g., adjusting the use of a valve—for example, the speed or frequency of actuation—to prolong the life of a component of the valve, switching to a redundant device/flow path, etc) based on data received from the integrated diagnostics module 124.

As illustrated in FIG. 2, and as described above, the integrated diagnostics module 124 may receive a variety of inputs in various implementations. Among the inputs are inputs from one or more operating conditions sensor(s) 122, one or more position sensor(s) 106, one or more process variable transmitter(s) 110, the process controller 112, and the communication interface 128. Each of the operating conditions sensors 122 may sense a different parameter (e.g., temperature, pressure, viscosity, flow rate, etc.), or may sense the same parameter as another sensor, but at a different location (e.g., upstream and downstream pressure, temperature of fluid flowing through the valve 102 and temperature of fluid controlling the actuator 104, etc.). Each of the one or more position sensors 106 may sense a position of a different element (e.g., the position of a valve stem and the position of an actuator stem). The integrated diagnostics module 124 may also include (e.g., as stored in a memory device) or retrieve/receive (e.g., via the communication interface 128) data and/or algorithms to use in determining the remaining useful life of the device or the components of the device.

Figure 3:
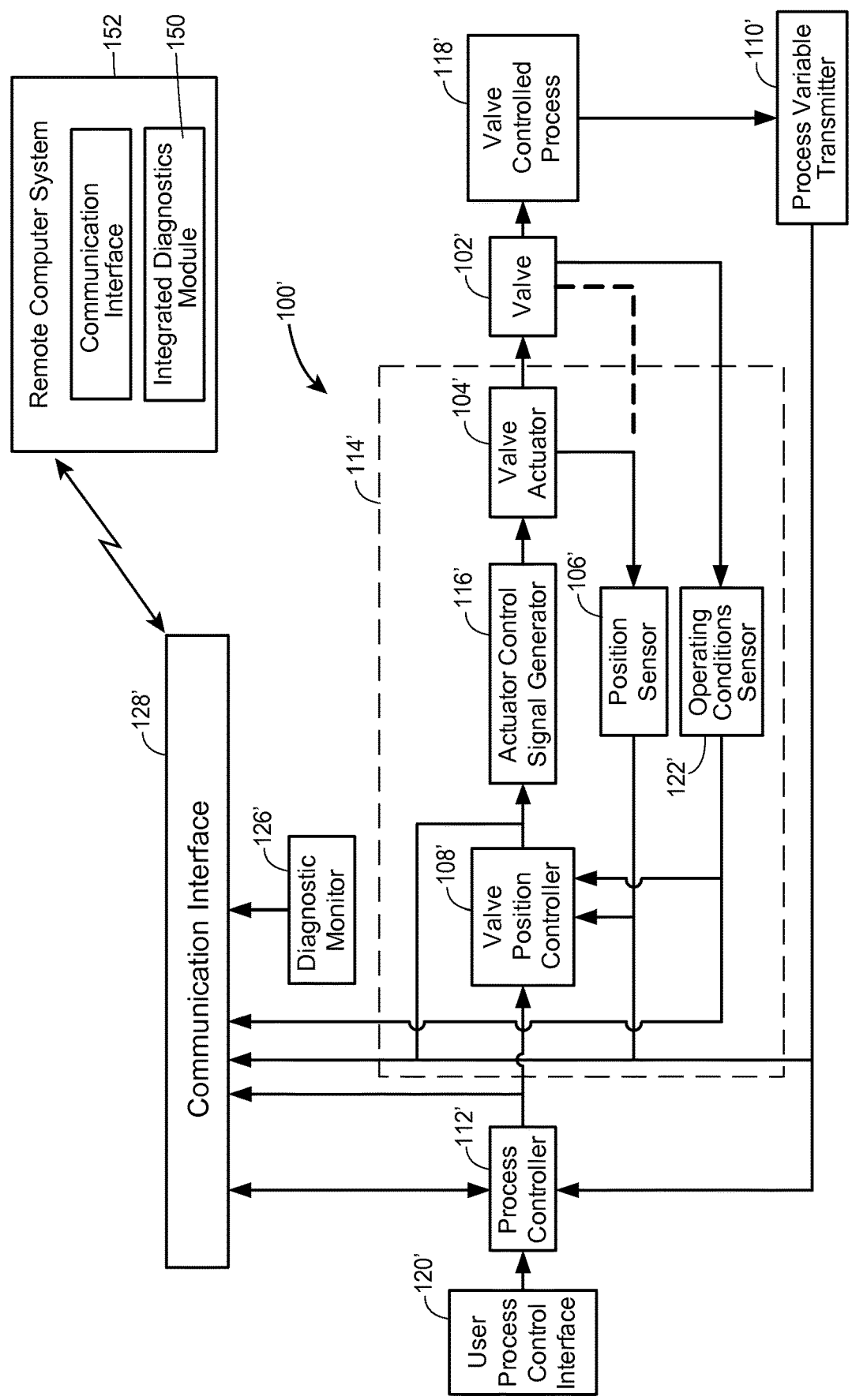
FIG. 3 is a block diagram of another example process control device used in a process control system, where the example process control device is a valve assembly and a remote computer contains an integrated diagnostics module.

In the example of FIG. 2 the integrated diagnostics module 124 is embedded within the valve assembly 100. For example, the module 124 may be implemented by an on-board processor (of the controller 114), or by instructions being executed by such a processor, in a smart process control device. FIG. 3 illustrates another example configuration, with a valve assembly 100', having similar features to that of valve assembly 100, except that an integrated diagnostics module 150 is contained within a remote computer system 152, such as a multiplexed host computer, a DCS system, a plant asset management system (such as the asset management system 50), or any combination of these. The communication interface 128' packages the operating conditions data from sensor(s) 122' and the sensor(s) 106' and transmits them to the remote computer system 152 for profiling by the integrated diagnostics module 150.

Figure 4:
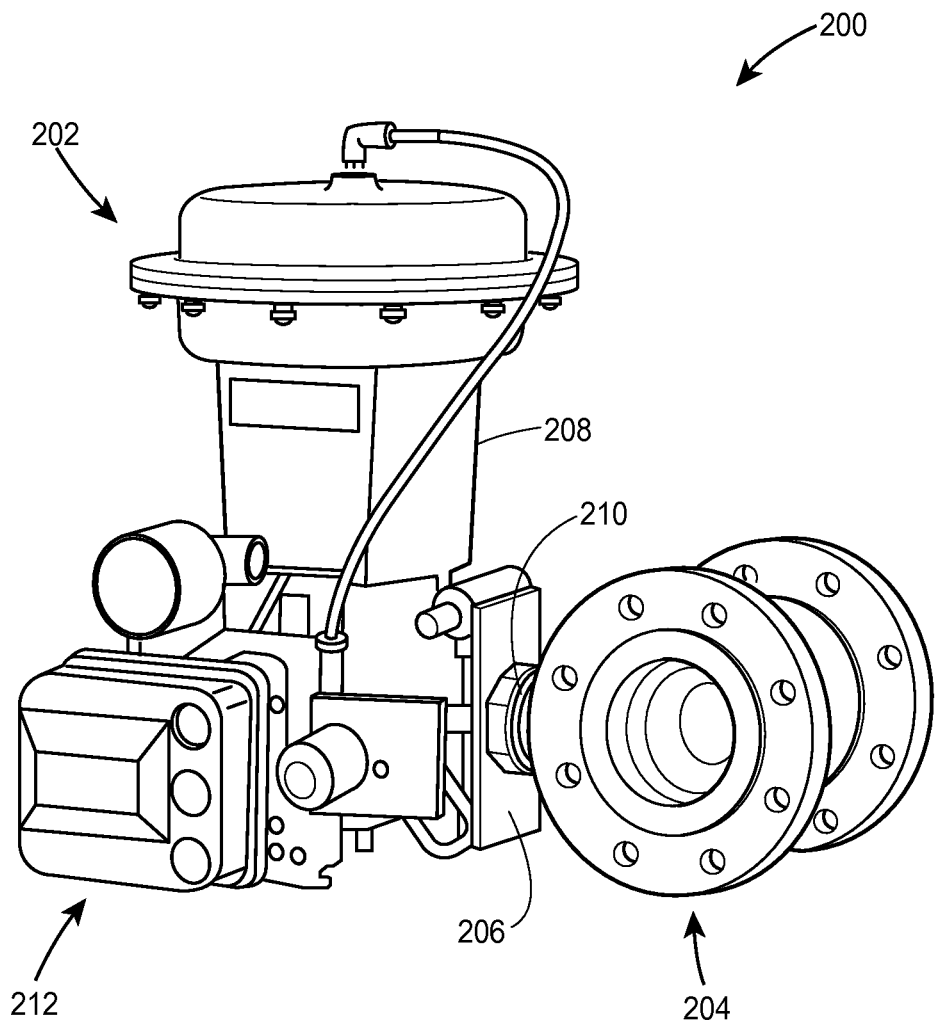
FIG. 4 illustrates an example of the valve assembly of FIGS. 2 and 3 showing various valve components that may be profiled.

FIG. 4 is an example process control device in the form of a valve assembly 200 made up of various components, which each have potentially different lifetime profiles that will be determined by an integrated diagnostics module (e.g., the integrated diagnostics module 124). In the illustrated examples these lifetime profiles are cycle lifetime profiles, because they depend on the number of operating cycles the valve experiences (e.g., the number of experienced fully open/close operations of the number of experienced partially open/close operations). In the illustrated example, the valve assembly 200 is formed of a series of components that may be profiled using lab testing data or previously collected historical data of actual in-use valve assemblies. In this way, lifetime profiles may be developed from real world data reflecting the particular conditions experienced in a processing plant installation. The particular components illustrated include a diaphragm header component 202 and a shaft receptacle 204 connected to a seal component 206 and engaged with a valve body 208 through packing gland (bushings, or bearings) component 210.

A valve controller 212 corresponding to the valve controller 114, in whole or in part, controls valve actuation and position. An integrated diagnostics module within the valve controller 212 collects various operating data and profile data to determine a cycle lifetime profile for each of these various components, using a prognostic algorithm. In some examples, such as FIG. 2, the prognostic algorithm is applied by an on-board processor within a dedicated positioner instrument, within a valve controller. In some examples, such as FIG. 3, the prognostic algorithm is applied by a multiplexed host computer in communication with the valve controller 212, such as the computer systems 30, 35 or 36. In yet other examples, a distributed process control (DCS) system or a plant asset management system, such as the asset management system 50, in communication with the controller 212 may be used. In yet other examples, a combination of these analysis configurations may be used, which may be beneficial when component cycle life from numerous different sources is used.

Figure 5:
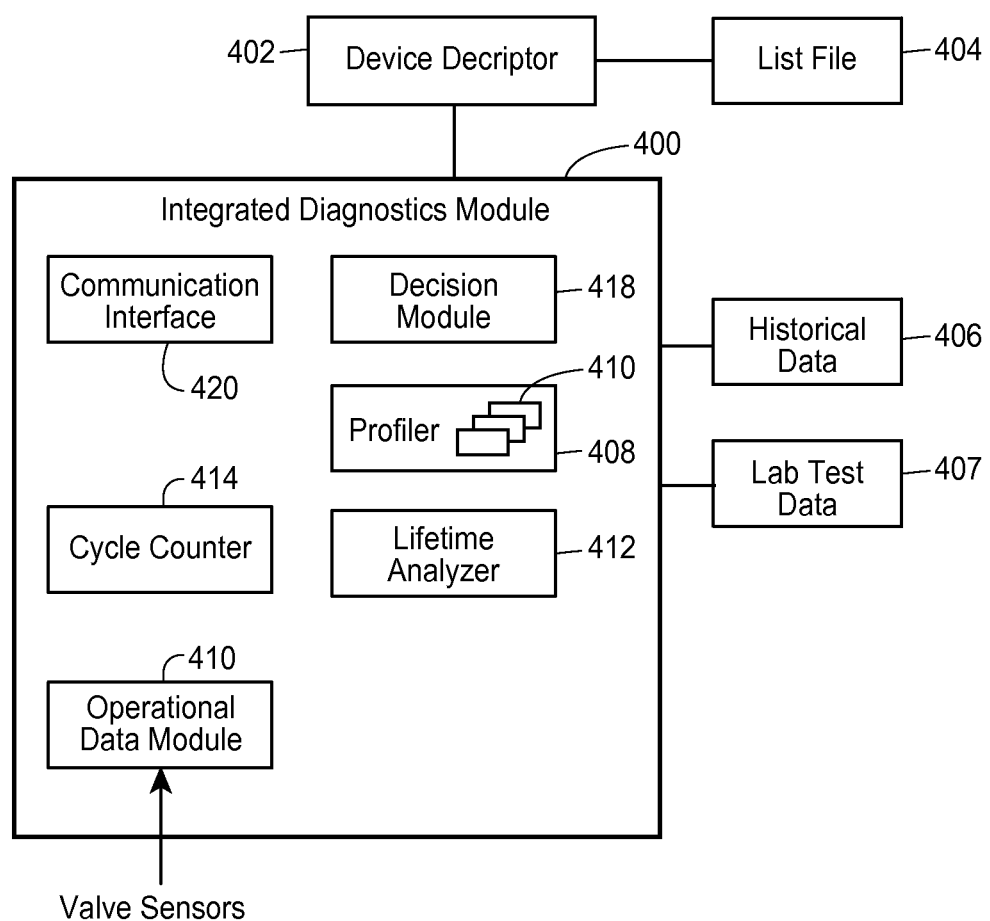
FIG. 5 is a block diagram of an integrated diagnostics module used to profile lifetimes of the valve components of FIG. 4.

FIG. 5 illustrates an example integrated diagnostics module 400 (corresponding, for example, to the integrated diagnostics module 124 or 150) as may be contained within the valve controller 312 or the remote computer system 152. The module 400 is configured to have access to a device descriptor 402 that identifies the particular process control device under analysis (e.g., valve assembly, pump assembly, damper, etc.). The device descriptor 402 may be embedded within the process control device either by the manufacturer or by a customer and may be a file, stored in a memory device, that is fixed or re-writeable, in various embodiments. In some examples, the device descriptor 402 is a re-writeable or otherwise configurable part of the user process control interface 120, so as to facilitate manual identification or selection of the particular process control device to be profiled. In any event, the device descriptor 402 may be stored locally at the process control device or on a remote computer system, such as the systems 12, 14, 30, 35, or 36.

The device descriptor 402 accesses a list file 404 that identifies the components forming the process control device and that have profilable lifetime, and may identify for each component any data needed to create a lifetime profile for the component, as described below. In the example of FIG. 4, the list file 404 identifies the diaphragm header component 302, the shaft receptacle 304, the seal component 306, and the packing gland component 310 as profilable components of the valve assembly 300.

In some embodiments, the components listed in the list file 404 depend upon the type of process control device. For a sliding stem valve assembly, for example, a list file 404 may identify any one or more of the following components that will experience mechanical wear or fatigue during operation: actuator diaphragm or piston and rod seals, actuator guide bushings or bearings, valve packing, valve stem, stem or plug guide bushings or bearings, valve plug balance seals, valve plug, valve cage, bellows seals, and/or actuator springs. For a rotary valve assembly, the list file 404 may identify actuator diaphragm or piston and rod seals, actuator guide bushings or bearings, actuator rod end bearings, valve shafts, valve bearings or bushings, seals, disks, balls, segmented balls or plugs, and/or actuator springs.

In other embodiments, the list file 404 may include all of the components for a particular line of devices of a particular type, or all of the components for a manufacturers entire product line. In these embodiments, the integrated diagnostics module 400 may retrieve from the list file 404 only data relating to the devices identified by the device descriptor 402. For example, the device descriptor 402 may identify (e.g., by being programmed/configured by an operator or technician) a particular type of valve actuated by a particular type of actuator. The module 400 may then retrieve from the device descriptor 402 data related to components that are associated with the particular actuator and valve types. In some embodiments, the list file 404 may be stored remotely, such as on a server accessible via a communication network such as a LAN (e.g., where the list file 404 is stored on a plant server) or the Internet (e.g., where the list file 404 is stored on a device manufacturer server).

The list file 404 may also identify fatiguing accessories mounted to a valve assembly or valve positioner, such as volume boosters, solenoids, trip valves, limit switches, position transmitters, instrument supply pressure regulators, and pneumatic tubing.

While a single list file 404 is shown in FIG. 5, in other examples, multiple list files may be used, for example, to allow standard valve components to be listed in one list file and fatigue accessories listed in another list file.

Where multiple components are stored in the device descriptor 402, different list files 404 for each part may be accessed under instruction from the integrated diagnostics module 400.

The list files 404 may be initiated and updated by a device manufacturer or customer, from operator input. For example a GUI interface may be provided (by interface 120) to an operator to allow for selecting pre-existing stored, component entries, as well as for adding and/or deleting component entries. Formation of the list file 404, therefore, may be performed prior to operation of the process control device. The list file 404 may be updated to include additional components added during operation of the part assembly. Such updating may occur through manual entry by an operator or automatically, for example, for systems in which as accessories are added to a part assembly those accessories are automatically detected by the part controller.

In addition to identifying components, the list file 404 may identify, for each of the listed components, an operating parameter that affects the mechanical wear or fatigue of that component during operation of the device. Because the lifetime of each component may be affected by different operating conditions, in some examples, the list file 404 identifies the different operating parameters that are to be accessed by the integrated diagnostics module 400 in developing a component lifetime profile. For example, a valve positioner may fatigue in response to numerous parameters, such as, current to pressure ratio (I/P) experienced by the valve nozzle/flapper, the piezo crystal, or the moving solenoid component. Additional parameters include pressure on a pressure relay, the position of linkages in a valve, the position of various feedback devices, whether such feedback is from a potentiometer, encoder or resolver device. Generally, these operating parameters identify the metrics that are to be sensed and evaluated using a prognostic algorithm to determine a lifetime profile for a component and for the process control device overall.

As discussed further below, the integrated diagnostics module 400 may also access stored historical data 406 having previously obtained operating data, maintenance data, mean time to failure, or other data on the device and its components.

In the illustrated example, the integrated diagnostics module 400 also accesses lab testing data 407 for the process control device and corresponding components listed in the list file 404. In other examples, only one of the lab testing data 407 or the historical data 406 is accessed by the module 400.

In the configuration of FIG. 2 the historical data 406 and the lab test data 407 may be stored locally or accessed remotely through the communication interface 128. In the configuration of FIG. 3 the historical data 406 and lab test data 407 may be stored at the remote computer system 152, e.g., accessible by the computer system 12, 14, 30, 35, and/or 36.

To diagnose operations of a process control device and develop lifetime profiles, the integrated diagnostics module 400 includes a profiler 408 that collects and stores historical data 406 and lab testing data 407 for at least some of the components listed in the list file 404. From this data the profiler 408 determines a lifetime profile for each of the identified components and based on the identified corresponding operating parameter(s) associated with that component. The profiler 408 may store previously developed lifetime profiles or may construct them.

The determined lifetime profiles are stored in a plurality of different profiles 410, as illustrated. Example profiles are illustrated in FIGS. 6A-6D.

Figure 6A:
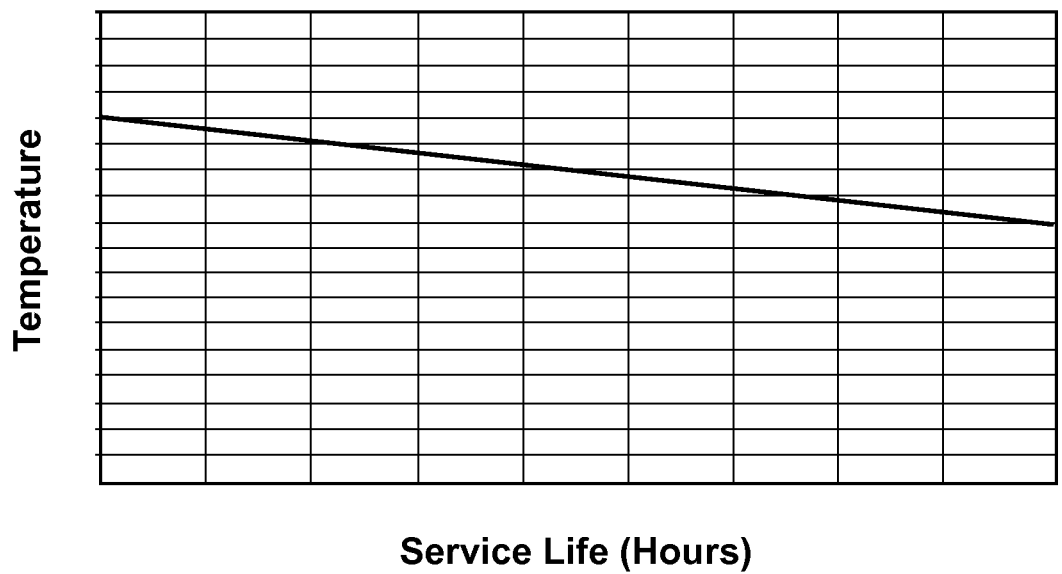
FIGS. 6A-6D are plots of projected lifetime profiles developed by the integrated diagnostics module for each of the valve components identified in FIG. 3.
Figure 6B:
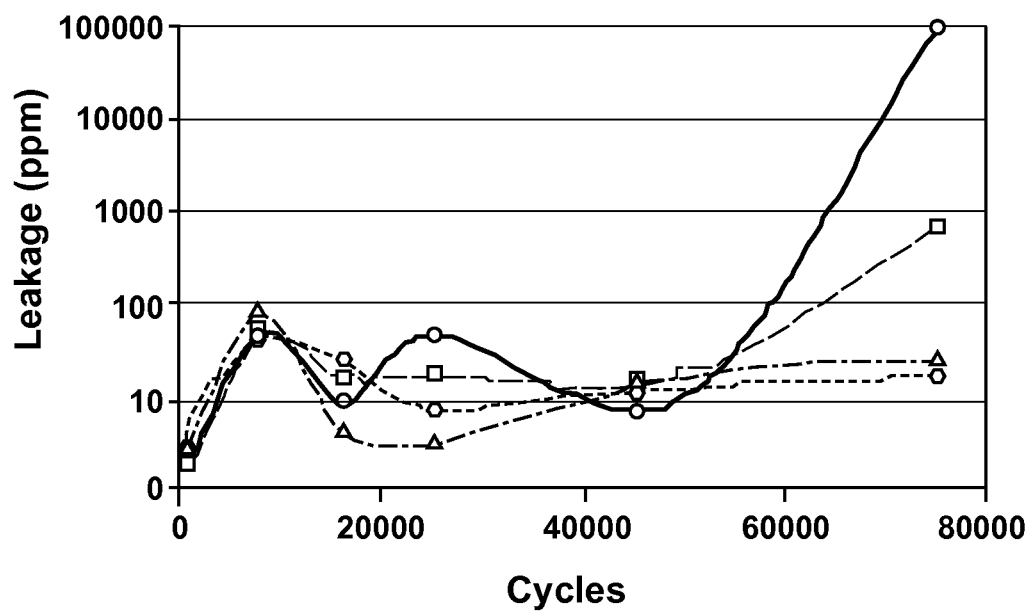

FIG. 6A is a lifetime profile developed by the profiler 408, for the diaphragm component 302, indicating the lifetime (in hours) of a diaphragm's oxidation level as a function of temperature and showing a linear downward sloping profile. FIG. 6B illustrates a cycle lifetime profile for the packing gland component 310, indicating the amount of leakage (measured in parts per million) as a function of operation cycles for the component. The cycle lifetime profile includes profile data for at least four different packing gland components, collected from the historical data 406 and/or the lab testing data 407.

When the profiler 408 is provided with multiple data sets, the profile 408 may average the data to determine a mean time to failure, i.e., where the data sets correspond to the same operating parameters. In some examples, the stored data may include historical or lab testing data taken at different operating parameters (e.g., one data set collected showing actual lifetime as a function of pressure another taken showing actual lifetime as a function of temperature). In such cases, the profiler 408 may develop profiles for a component at each of the different operating parameters.

Figure 6C:
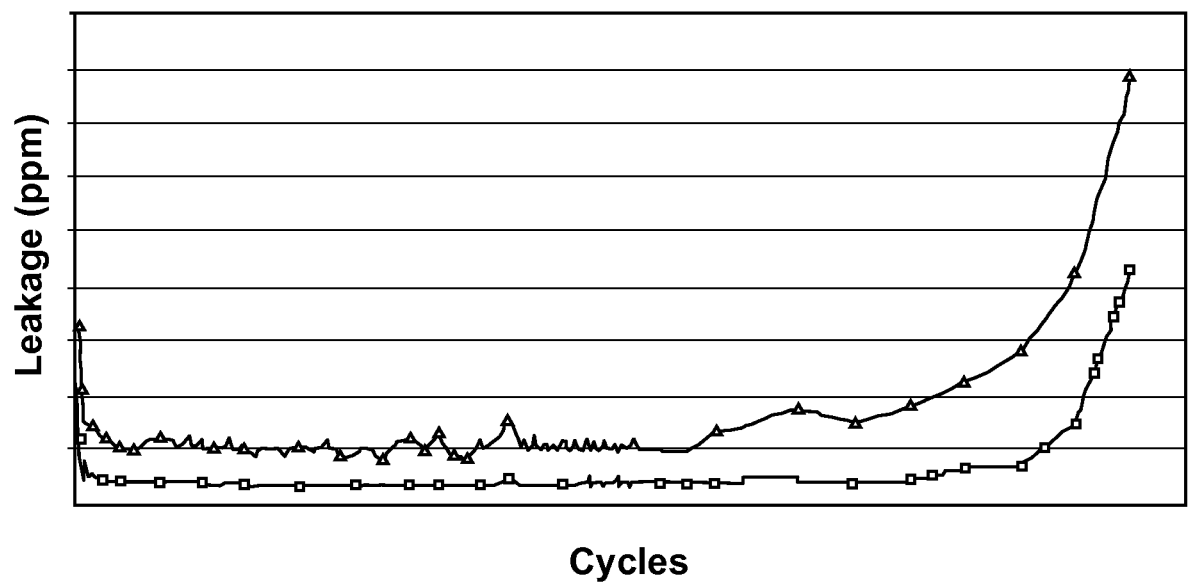
Figure 6D:
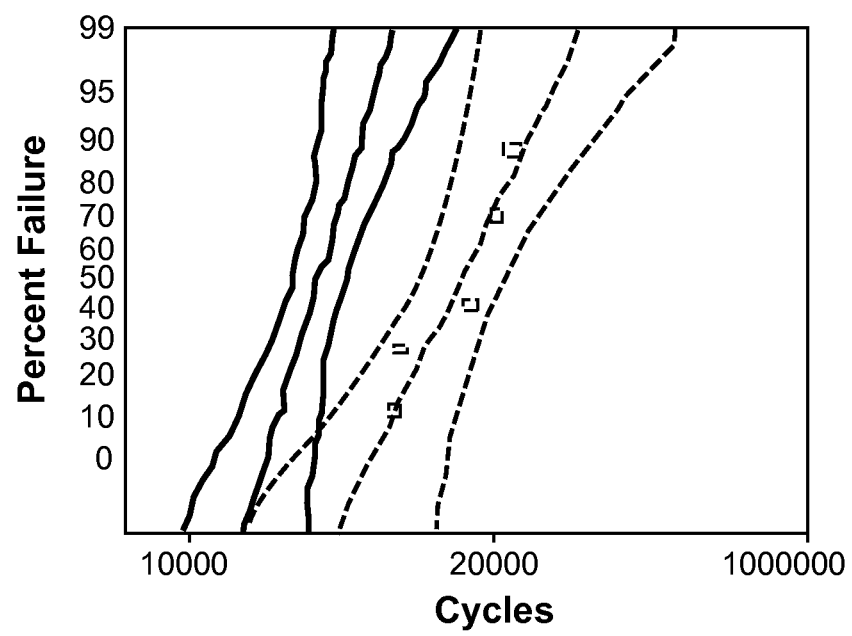

FIG. 6C is a cycle lifetime profile developed for the seal component 306, indicating the amount of leakage (in ppm)

as a function of the number of operating cycles. FIG. 6D is a cycle lifetime profile for the shaft component 304, indicating the percentage failure as a function of the number of operating cycle. While four cycle life profiles are shown, for example purposes, it will be appreciated that any number of cycle life profiles may be stored in the profiler 408 and used by the integrated diagnostics module 400.

In some examples, the profiler 408 is pre-populated with lifetime profiles for components identified in the list file 404, for example, where the components have been previously profiled, at similar operating conditions. In either case, the profiler 408 is able to update the lifetime profiles based on elapsed time, the number of cycles, or other parameters. For example, for a valve assembly, the profiler 408 may receive a cycle count from a valve positioner or valve state counter 414. The profiler 408 may receive a temperature value from a temperature sensor (not shown). The profiler 408 may receive position data for the valve from a position sensor. The profiler 408 is able to adjust the lifetime profiles for the components and for the overall valve assembly, based on these parameters.

The integrated diagnostics module 400 collects sensor data (e.g., from sensors 106 and 122) and stores operating conditions for the process control device in an operational data module 410. The operating conditions may be real time sensed data corresponding to the operating parameters identified in the list file 404. As discussed above, for a valve assembly, the sensed data may include any parameter that will affect the mechanical wear or fatigue of the listed components or the valve assembly as a whole, including current to pressure (I/P) experienced by the valve nozzle/flapper, the piezo crystal, or the moving solenoid component, pressure, component temperature, ambient temperature, fluid rate, leakage, oxidation level, the position of linkages in a valve, and the position of various feedback devices.

The operating data from the module 410 are provided, along with the lifetime profiles from the profiler 408, to a remaining lifetime analyzer 412 that analyzes current operating data against the corresponding profiles, for the components, to determine a projected remaining lifetime each component and/or for the entire process control device. For the latter, the analyzer 412 applies a multifactorial analysis algorithm to the received data, to determine the projected lifetime, based on the projected life times of each of components. The projected remaining lifetime values may be cycle lifetime values, when indicated as a function of remaining operating cycles for a valve assembly, for example. While in other examples, the projected remaining lifetime values may be measured or indicated in a counter time or projected failure date. For example, the lifetime analyzer 412 may receive the cycle count value from the counter 414 which it then compares to the profiles from the profiler 408 to determine a projected remaining cycle lifetime.

The analyzer 412 may include a confidence determination that assesses whether enough operational data and profiles have been provided to it to make a sufficiently accurate determination of projected cycle life for the process control device. A warning indication may be provided if insufficient sensor data are collected and a remaining projected lifetime cannot be determined for a given valve component.

The analyzer 412 provides the projected cycle life time determination to a decision module 418 that determines a notification state for the determination. In an example, the notification state has one of three conditions: (i) NORMAL, indicating no required maintenance; (ii) MAINTENANCE, indicating that maintenance or replacement will be needed at the next scheduled service; or (iii) ALERT, indicating that maintenance or replacement is needed before the next scheduled service. An alert mechanism may be provided on the process control device to indicate the notification state, e.g., with color coded lights or a display. The decision module 418 is coupled to a communication interface 420 (which may be the communication interfaces 128 or 128') for communicating the notification state and projected lifetime determination to a remote computer or operator, such as the remote computer systems 12, 14, 30, 35, and/or 36, shown in FIG. 1. In addition to providing a local indication of notification state, the communication interface 420 may be a wired or wireless communication interface providing of the indication of the notification state to a host computer, DCS, remote computer, or the like, which, in at least some embodiments, causes a controller to modify the operation of the process plant according to the notification state, for example by decreasing the frequency or speed of actuation, or by switching to a redundant flow path.

In this way, the present techniques may provide a warning message to a control room operator, maintenance department or reliability engineering department, where the warning message quantifies the prognosticated remaining time to failure of the component. In some examples, the warnings may be set far enough in advance that they appear during a scheduled maintenance outage occurring before the projected failure time. This would give personnel a chance to plan for service or replacement of the component before the expected failure. The warning messages may include repair data such as recommend spare parts or recommended service actions. The warning messages may be provided to a remote computer system to facilitate manual repair ordering or to enable automatic order of replacement parts from a component manufacturer. The warning message may be provided to business system computers and maintenance planning computers 35 and 36, which may not only facilitate ordering or replacement parts, as described, but also scheduling such replacement, e.g., during an already scheduled maintenance outage or during a future maintenance outage.

In some examples, the timing of the warning message may be set by the operator of the process control device to be longer or shorter than previously set depending upon the assessed condition of the process control device and the impending service projection. For example, the integrated diagnostics module 400 may be configured to provide more frequent warning messages as the projected failure point nears. The timing of the warning messages may also be controlled after the initially warning message has been sent.

As a process control device's performance deteriorates, and more specifically, as the performance of the various components deteriorates, the projected cycle life time data, as well as the eventual actual cycle life time data, are stored in the historical data 406. From here data such as the MTTF and MTBF for components may be stored for later reference by the integrated diagnostics module 400 or a module for another device, thereby improving the accuracy of future cycle lifetime projections. In some examples, such historical data may be shared with manufactures, through dedicated wired or wireless communications, with the component owner's consent. For example, such data may be provided by granting access to a shared database, website or wireless network, storing a copy of the historical data 406. Providing this data allows for eventually replacing lab data with data developed using more-reliable algorithms at the manufacturer end.

The prognostic capabilities of the system herein can be customized, based on field experience for a specific application. As with the profiler 408, the criteria of the lifetime analyzer 412 and decision module 418 can be set based on numerous parameters such as elapsed time, valve travel, cycles, temperature, etc. In this way diagnostic capabilities may be based on field experience in prior installations and data collected by the device controller.

Figure 7:
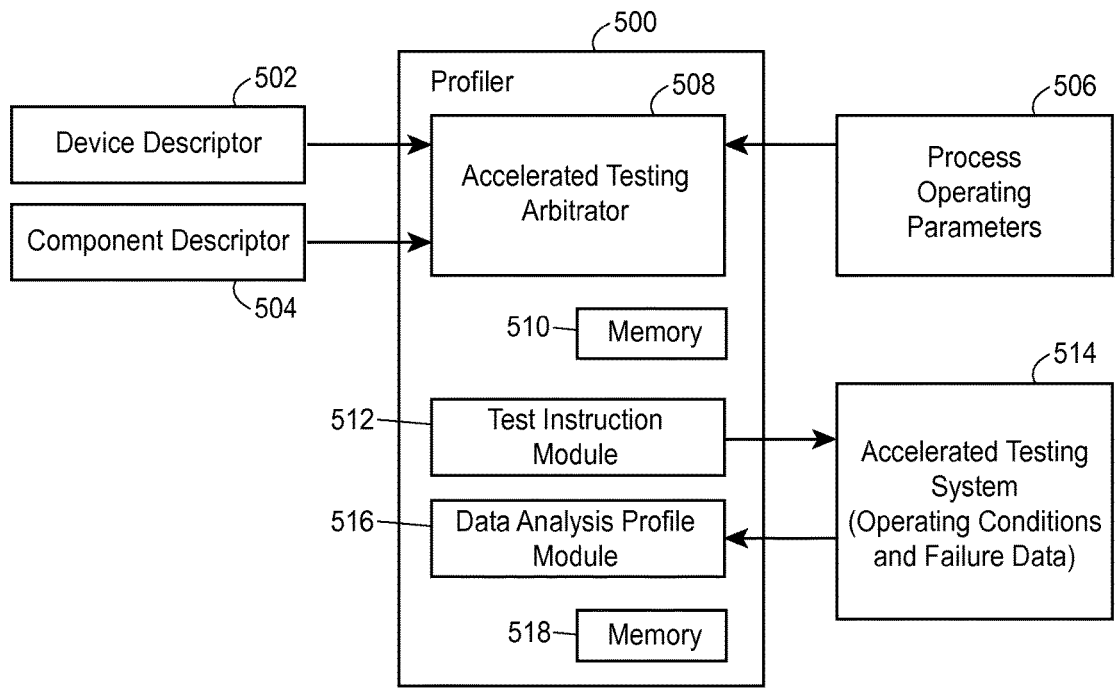
FIG. 7 is a block diagram of an example profiler to develop accelerated aging test protocols and lifetime profiles.

FIG. 7 illustrates an example profiler 500 to develop and oversee execution of accelerated lab testing and to determine projected lifetime profiles for process control devices and/or components thereof. The profiler 500 may be implemented in an integrated system, such as the integrated diagnostics module of FIG. 5 that provides lifetime projections and assessments based on current operating conditions. In other examples, the profiler 500 may be implemented as an independent system. The profiler 500 may be implemented within a control of a process control device or from a dedicated process controller, including, for example, any of process control systems 12, 14, 30, 35, and 36, or a combination thereof. In any event, the profiler 500 may be implemented as a special purpose processor hardcoded to perform the functions of the profiler 500 or as a specially-configured general-purpose processor executing computer-instructions to perform the functions of the profiler 500.

In the example of FIG. 7, the profiler 500 is described in reference to determining a lifetime profile for a component of a valve that is susceptible to operating parameters that result in oxidation aging. The profiler 500 develops laboratory-testing protocols to be used in accelerated aging testing that determine when the component has failed due to oxidation. While profiling relative to oxidation failure is assessed and described, it will be appreciated that none of the present techniques herein are limited to the particular examples described. Rather, these techniques may be used to individually profile component lifetimes for any number of components (such as those described above), for any number of different types of process control devices (such as those described above), for multiple types of component failure (such as those described above and below), and for operating conditions beyond those discussed by example herein (such as those described above). Further still, profilers may be called upon to profile a single component, or multiple components simultaneously, for example in developing multi-variable lifetime profiles, such as when profiling component lifetime for numerous simultaneous operating parameters as well as when profiling a process control device having different components each with different lifetime profiles.

The profiler 500 is coupled to a device descriptor 502 and associated component descriptor 504, that, respectively, identify the process control device to be profiled and any components thereof. For example, the device descriptor 502 may identify the valve assembly 200, while the component descriptor 504 may identify the diaphragm component 202 or the actuator rod seal component 206 (typically an O-ring), by type, material, configuration, etc. These are examples of components that experience mechanical wear or fatigue in response to different operating conditions and will eventually result in oxidation failure of the valve. The component descriptor module 504 will identify any number of these and other components for possible accelerated lab testing. Other valve-specific components include elastomeric bellows that protect the actuator rod, as may be contained in the packing component 210. Yet, other components that respond to (or are indicative of) oxidation aging include the piston actuator, specifically, piston and rod seals, whether O-rings, quad rings, spring energized lip seals or plastic wear rings with elastomeric backup rings. Oxidation aging components in a valve positioner include pressure sealing O-rings and diaphragms in the relay assembly, O-rings sealing the pressure sensors and/or current to the pressure transducers, and O-rings sealing different modules and/or housings together or sealing the positioner from the ambient environment.

The component descriptor module 504 may further identify normal oxidation aging components contained in accessories of a valve assembly, including elastomeric O-rings, diaphragms, plugs, and/or seats in volume boosters, soft seats or O-rings in solenoids, soft seats or O-rings in trip valves, elastomeric dust seals on limit switches, elastomeric dust seals on position transmitters, diaphragms, O-rings and soft plugs or seats in instrument supply pressure regulators, and polymeric pneumatic tubing.

To develop a particular projected lifetime profile, the profiler 500 creates accelerated lab testing protocols that are condition specific, i.e., that model the expected operating conditions experienced by the device and/or the device components while in service. The profiler 500, therefore, may be coupled to a process operating parameters module 506 that provides data on the expected operating conditions. The process operating parameters module 506 may reside within a control system and contain automatically-generated and/or manually-provided operating conditions data, such as composition of pumped fluid, pressure, current to pressure (I/P) experienced, component temperature, ambient temperature, fluid rate, leakage, oxidation level, valve position, component position, maximum and minimum stroke positions of a valve, diaphragm compression, material hardness, and the position of various feedback devices.

An accelerated testing arbitrator 508 receives device descriptor, component data, and operating parameter data. In some examples, the arbitrator 508 performs initial analyses to identify components for profiling, such as identifying components that have been profiled in the past, identifying components flagged for profiling, identifying components that are statistically more accurate predictors of projected lifetime, identifying components that may be more accurately profiled through accelerated laboratory testing. In some examples, the arbitrator 508 may rank components based on these or other factors. In some examples, the arbitrator 508 may identify all components meeting a threshold suitability condition for profiling.

The arbitrator 508 may determine if sufficient operating parameter data has been collected from the module 506 to formulate accelerated lab testing. For example, the arbitrator 508 may compare received data from module 508 against received operating parameter data from module 504. The arbitrator 508 may assess whether a minimum amount of operating condition data has been provided, from which accelerated lab testing protocols can be developed.

Figure 8:
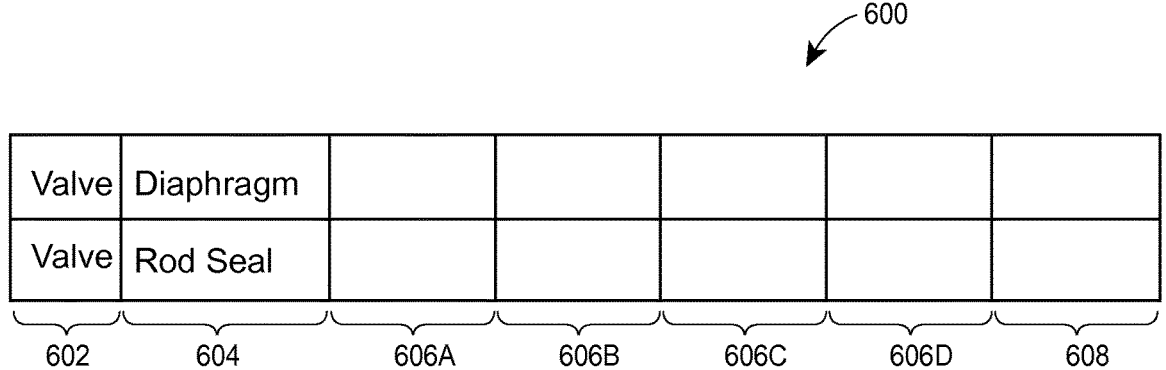
FIG. 8 illustrates an example accelerated against test protocol frame as developed by the profiler in FIG. 7.

The arbitrator 508 then formulates the accelerated lab testing conditions, based on the received operating condition data, producing, by way of example, a series of instructions data frames, such as that shown in FIG. 8. An accelerated lab testing protocol 600, includes a process control device identifier field 602, a component field 604, and a plurality of operating condition fields 606A-606D, corresponding to different operating conditions. The fields 606A-606D may be expressed in various formats, e.g., including high and low parameter values, rate of change values for those parameters, testing length, etc. For each component identified at the fields 604, different ones of the operating condition fields 606A-606D may be populated with accelerated testing instructions. A field 608 stores assurance factor data that may be used to determine whether sufficient amounts of accelerated aging test data is obtained. For example, the field 608 may store the number of requested accelerated aging tests to be performed of renditions of the component, to assure data accuracy.

For elastomeric components, accelerated test protocols are developed that to model in-service lifetime aging. The desire is to replicate operating parameters, like the amount of oxygen available to react with elastomeric materials in the diaphragm, as well as the temperature of those reactions, along with the internal device pressure.

In some examples, the testing protocols may include entries for each of the operating parameters that affect performance. Testing protocols may include not only the values of the operating parameters, but instructions on how those parameters are to be cycled, up or down, during testing. Furthermore, the amount of overall time for performing the testing (indicated in a field 606i) may be taken into account, in setting parameters, so as to avoid taking too long to complete the failure test or hampering profiling by activating other mechanisms. For example, a test protocol using too low a temperature may take too long to establish failure in a component, while using too high a temperature may cause other chemical reactions to occur in an elastomeric material, such as activating the cure system. Elevated temperatures can also affect the test fixtures, especially if the fixtures are painted, made of a thermoplastic, zinc or aluminum, due to creep and/or thermal expansion.

In some examples, accelerated testing should match and model the dominant failure mechanisms at play in actual service, which can change for different process control devices in different processing plant applications and/or under different operating conditions. For example, fabric reinforced diaphragms ultimately fail by oxidation embrittlement, so that they fracture during flexure. Any other failure mode, such as loss of flange retention, ozone crazing, or delamination results from premature failure that should be eliminated through product design and/or material properties. Static O-rings ultimately fail by compression set causing leakage. The same elastomer formulation will exhibit different activation energy when tested as an O-ring failing by compression set or as a diaphragm failing by oxidation embrittlement. In other words, in performing accelerated testing, care must be taken to appropriately measure from among the many potential operating conditions that can appear to predict failure lifetime. Therefore, the accelerated testing should replicate as accurately as possible the actual operating conditions of the application in service.

Furthermore, a statistically significant number of samples should be tested to avoid data scatter error. More data points will narrow the statistical confidence interval of the resulting profile lifetime and provide more reliable models.

The testing protocols 600 may be stored in a local memory 510 and communicated to an optional test instruction module 512 that may be used to convert the protocols to executable instructions for automatically operating accelerated testing laboratory equipment in a system 514. In other examples, the module 512 may produce an instruction file for an operator to manually perform the accelerated testing using the system 514. The profiler 500 may communicate with the system 514 through a wired or wireless communication link.

The accelerated testing system 514 performs the accelerated aging testing on a process control device and components thereof, measuring operating conditions until component failure. The collected data is provided to a data analysis profile module 516, which develops the projected lifetime profile for the components tested and/or for the process control device, itself, where the lifetime profile is stored in a memory 518.

Prior to storage, the module 516 may perform data analysis on the received accelerated testing data. The module 516 may determine if sufficient operating condition data were collected during accelerated testing. The module 516 may determine if the failure condition is sufficiently correlated to any of the operating condition collected, e.g., through a linear regression analysis. The module 516 may determine which of the operating condition data are most accurate in predicting failure, for example, which collected operating parameter data of an elastomeric material (pressure, temperature, diaphragm compression, hardness, etc.) best predicts a oxidation failure. In this way, module 516 may store selected ones of the developed lifetime profiles, for use by an integrated diagnostics module.

In other words, the module 516 may be able to discriminate between different accelerated aging tests to determine which one or ones is most predictive of lifetime and identify such tests for use. For example, for some process plant operating conditions, a simple hardness test may be the preferred measurement for assessing the extent to which an elastomeric component has progressed to failure. The harder the elastomeric material, the closer it is to failure. Accelerated testing data shows that a given elastomer in a given application may fail repeatedly as it approaches a given hardness value. Such indicators may be elastomer material specific, for examples. In some examples, all elastomers under particular operating conditions may exhibit this failure as they approach the same hardness level.

In any event, the module 516 is able to develop a projected lifetime profile based on accelerated lab testing performed at different operating conditions, and in such a way that the profile may be adjusted as various ones of those operating conditions is altered. That is, at least, some of the operating conditions may be variable to allow refining of the lifetime profile during service. For example, depending on the measured hardness of a diaphragm component, e.g., taken when the valve assembly is in service, the projected lifetime profile may be extended in time if the measured hardness is below an expected value or shortened in time if the measured hardness is greater than expected. These modifications to the lifetime profile may be done automatically in response to operating condition data collected during actual installation in the process plant. For example, the lifetime profile may include an adjustable parameter that can be refined by the user of the component based upon the characteristics of elastomers taken out of service that are not yet failed. Depending on the measured hardness of these components taken out of service, for example, the adjustable parameter may be adjusted to extend or shorten the predicted failure time if the measured hardness is lower or greater than expected, respectively.

A similar scenario to measure the progressive oxidation of an elastomeric component is the relative sizes of the characteristic wave number peak using Fourier transform infrared spectrometry (FTIR). Oxidation elastomers with a carbon backbone form $C=O$ bonds that can be detected with FTIR at about wave number 1702. This wave number varies, however, depending upon near neighbor bonds. As more bonds are progressively formed, the relative height of the peak is greater. While achievable, this form of measurement may be less desirable than a simple predictive hardness measurement, because of the cost of the instrumentation and expertise required to complete the testing, as well as because of the difficulty in quantification of relative peak heights.

It is noted that elastomeric components may fail by mechanisms other than oxidation. For instance, dynamic O-rings and seals can fail by simple mechanical wear. Fatigue is another failure mode that is made possible by cyclic shear or tensile stress and is accelerated by oxidation aging. This phenomenon may be accelerated with elevated temperature techniques.

The profiler 500 may not only request accelerated tests based on increasing temperature, but also accelerated tests designed to project low operating temperature lifetime profiles for an elastomeric material. Cracking and failure can occur prematurely at low operating temperatures. In at least one embodiment, low operating temperatures means temperatures approaching −60° C. (e.g., temperatures lower than −30° C., temperatures lower than −40° C., temperatures lower than −50° C., etc.). When warmed back to room temperature, the properties of the elastomer become as new, and may not exhibit oxidation aging. However, the increased stiffness of the elastomeric diaphragm (flex modulus), imparted by the low temperature, may cause the diaphragm to flex in a more localized area, thereby increasing applied stress and initiating fatigue cracks that eventually propagate to failure. The profiler 500 therefore may develop an accelerated testing protocol to cycle the end of life as a function of temperature, producing lifetime profile curves for more than one elastomer compound and multiple data points at each temperature. In doing so, the profiler 500 may predict lifetime profiles for components based on exposure to low temperatures alone or in combination with oxidative aging.

Numerous variations to the foregoing will be appreciated. For example, instead of developing actual accelerated aging test instruction, a profiler may compare determine test protocols against a database of previously-performed accelerated aging tests to determine if any suitable testing data already exists, from while profiling can occur.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

Still further, the figures depict preferred embodiments of a map editor system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for developing a projected lifetime profile for a component of a valve assembly, the method comprising:

receiving, at a profiler of the valve assembly, an indication of at least one operating parameter of the component that affects oxidation aging of the component, over time, during operation of the valve assembly in a process installation, wherein the operating parameter comprises an operating environment parameter;

receiving, at the profiler, in-service operating conditions the component is expected to experience during operation of the valve assembly in the process installation from an operating conditions sensor;

developing, in the profiler, at least one accelerated aging test protocol, based on the in-service operating conditions the component is expected to experience, where the at least one accelerated aging test protocol is designed to simulate operation of the component to oxidation failure under the in-service operating conditions;

receiving, from an accelerated test system, accelerated age testing data developed by performing the at least one accelerated aging test protocol on a rendition of the component;

developing, in the profiler, a projected lifetime profile for the component based on the accelerated age testing data and the operating parameter, wherein the projected lifetime profile comprises a plurality of lifetime values corresponding to a plurality of values associated with the operating parameter;

receiving, at an operational data module, during operation of the component in the process installation, sensed data including at least:
  data reflecting the operability of the component when in use in the process installation; or
  data reflecting conditions experienced by the component during operation of the valve assembly when in use in the process installation;

determining, at a lifetime analyzer of the valve assembly, a projected remaining lifetime of the component, based on the projected lifetime profile for the component and the sensed data;

generating, by a controller of the valve assembly, a control signal to adjust at least one of actuation or position of the component; and transmitting, via the controller of the valve assembly, the control signal to the component of the valve assembly to adjust the at least one of actuation or position of the component to prolong a life of the component using the projected remaining lifetime.

2. The method of claim 1, wherein the component is formed of a polymeric component.

3. The method of claim 2, further comprising:
receiving the indication of the at least one operating parameter the component from a component descriptor in communication with the profiler, and wherein the at least one operating parameter is selected from the group consisting of composition of fluid passing through valve assembly, pressure, current to pressure (I/P), component temperature, ambient temperature, fluid flow rate, valve leakage, oxidation level, valve position, maximum and minimum valve stroke positions, polymeric component compression, and polymeric component material hardness.

4. The method of claim 2, wherein the polymeric component is an elastomeric component.

5. The method of claim 2, further comprising:
developing a plurality of proposed accelerated aging test protocols;
identifying, from among the plurality of proposed accelerated aging test protocols, at least one test protocol correlative to an oxidation failure of the polymeric component; and
setting the identified at least one test protocol correlative to the oxidation failure as the at least one accelerated aging test protocol.

6. The method of claim 5, further comprising:
identifying a plurality of test protocols correlative to the oxidation failure of the polymeric component; and
identifying from the plurality of test protocols correlative to the oxidation failure a subset having a higher correlation to oxidation failure than a remaining subset of the plurality of text protocols correlative to the oxidation failure; and
setting the identified subset as the at least one accelerated aging test protocol.

7. The method of claim 2, further comprising:
developing a plurality of accelerated aging test protocols;
receiving, from the accelerated test system, accelerated age testing data developed by performing each of the plurality of accelerated aging test protocols;
determining, in the profiler and from the accelerated age testing data, the accelerated age testing protocol most correlative to an oxidation failure of the polymeric component; and
developing the projected lifetime profile based on the accelerated age testing data from the accelerated age testing protocol most correlative to the oxidation failure.

8. The method of claim 2, wherein the projected lifetime profile is an oxidation fatigue profile, a fluid leakage profile, or a low temperature fatigue profile.

9. The method of claim 2, further comprising determining if a statistically significant amount of the accelerated age testing data has been received by the profiler, and developing the projected lifetime profile, if a statistically significant amount has been received, otherwise, not developing the projected lifetime profile.

10. The method of claim 2, wherein the projected lifetime profile is configured to be updatable in response to changes in actual operating conditions.

11. The method of claim 1, further comprising:
preparing, in the profiler, instructions for performing an accelerated age test based on the at least one accelerated aging test protocol.

12. The method of claim 11, wherein the instructions are executable instructions, the method further comprising communicating the executable instructions to the accelerated test system for automatically executing the at least one accelerated aging test protocol.

13. The method of claim 1, wherein the projected lifetime profile includes an adjustable parameter for adjusting the lifetime profile according to a measured characteristic of components, corresponding to the component, that were previously in service.

14. The method of claim 13, wherein the measured characteristic is hardness and further comprising:
adjusting the adjustable parameter to extend a projected lifetime for the component if the measured hardness of the components that were previously in service is lower than expected according to the projected lifetime profile; and
adjusting the adjustable parameter to shorten the projected lifetime for the component if the measured hardness of the components that were previously in service is higher than expected according to the projected lifetime profile.

15. The method of claim 1, further comprising:

developing, in the profiler, a second projected lifetime profile for a second component of the process control device; and developing a multi-variable projected lifetime profile for the process control device based on the projected lifetime profile of the component and the second projected lifetime profile of the second component.

* * * * *